United States Patent [19]

Buenzli, Jr.

[11] 4,042,855

[45] Aug. 16, 1977

[54] HIGH FREQUENCY TRANSISTOR BALLAST

[75] Inventor: Charles W. Buenzli, Jr., Lancaster, Pa.

[73] Assignee: Armstrong Cork Company, Lancaster, Pa.

[21] Appl. No.: 586,149

[22] Filed: June 12, 1975

[51] Int. Cl.² .......................................... H05B 41/29
[52] U.S. Cl. .................... 315/219; 315/220; 315/284; 331/113 A; 331/113 S; 363/133; 363/135
[58] Field of Search .............. 315/101, 105, 94, 219, 315/220, 284, 362, DIG. 5, DIG. 7, DIG. 2; 331/113 A, 113 S; 307/282; 321/45 R

[56] References Cited

U.S. PATENT DOCUMENTS

| | | | |
|---|---|---|---|
| 2,923,856 | 2/1960 | Greene et al. | 315/DIG. 7 |
| 2,928,994 | 3/1960 | Widakowich | 315/205 |
| 2,964,676 | 12/1960 | Davies et al. | 315/98 |
| 3,248,605 | 4/1966 | Tompkinson | 315/241 P |
| 3,317,856 | 5/1967 | Wilkinson | 331/113 A |
| 3,579,026 | 5/1971 | Paget | 315/99 |
| 3,700,956 | 10/1972 | Cluett | 315/101 |
| 3,710,177 | 1/1973 | Ward | 315/DIG. 5 |
| 3,753,071 | 8/1973 | Engel et al. | 315/DIG. 7 |
| 3,753,076 | 8/1973 | Zelina | 315/DIG. 7 |
| 3,754,160 | 8/1973 | Jensen | 315/97 |
| 3,758,821 | 9/1973 | Canup | 331/113 A X |
| 3,766,467 | 10/1973 | Reising, Jr. | 315/DIG. 5 |
| 3,769,545 | 10/1973 | Crane | 315/219 |

Primary Examiner—Eugene R. La Roche

[57] ABSTRACT

A high frequency transistor ballast is utilized to drive flourescent lamps. The electrical system of the ballast consists of a central rectifying and control panel and a high frequency inverter. There is also provided a low energy switch in the high frequency inverter system controlling the operation of the high frequency transistor ballast.

10 Claims, 2 Drawing Figures

HIGH FREQUENCY TRANSISTOR BALLAST

BACKGROUND OF THE INVENTION

1. Field of the Invention

The invention is directed to a ballast system for a flourescent lighting system and more particularly to a high frequency transistorized ballast.

2. Description of the Prior Art

It was recognized early in the development of flourescent lighting that efficiency increases with increasing operating frequency. During the 1960's, some attempts were made to utilize this increased efficiency coupled with solid-state high frequency inverters. However, the solid-state devices available at that time were expensive and had marginal characteristics for the application involved.

In the past two years, the state of the art relative high voltage semiconductors has become practical and inexpensive. Therefore, it is now feasible through careful design to produce a more efficient flourescent lighting system at a competitive cost.

U.S. Pat. No. 3,579,026 discloses a rectifier circuit with a switching circuit built thereinto. U.S. Pat. No. 3,710,177 discloses an inverter that supplies voltage at a frequency less than the resonant frequency and the improvement therein is the use of a means within the inverter whereby the inverter can deliver a reduced voltage at a frequency near the resonant frequency to facilitate conditioning of a lamp. U.S. Pat. No. 3,758,821 discloses the use of a sarturated coil transformer having magnetic properties such as to cause an increase in the frequency of the oscillator as the load on the output transformer increases. Finally, U.S. Pat. No. 2,928,994 discloses a lamp ballast wherein there are frequency variations proportional to the voltage of the source and induction in the lamp circuit will compensate for frequency variations to maintain substantially constant lamp current.

Transistorized inverters have been taught in the EEE magazine as far back as February 1969 (pages 114–116) and in the Electrical Manufacturing magazine as far back as the January—February 1960 issue (pages 79–94).

There exist in the art many patents which are directed to transistor ballast systems for flourescent light circuits. Typical of these patents are U.S. Pat. Nos. 3,769,545; 3,766,467; 3,754,160; 3,700,956; and 2,964,676. All of these patents disclose different transistorized circuits for driving flourescent lamps.

SUMMARY OF THE INVENTION

According to the invention, the high frequency transistor ballast will operate flourescent lights. The system consists of two subassemblies. The first is a central rectifying and control panel. The second is a fixture mounted high frequency inverter capable of driving two 40 watt flourescent lamps.

Th rectifying and control panel conditions the 120 volts alternating current supply into a nominal 115 volt direct current. This is accomplished through a SCR phase controlled rectifier with choke input filtering. This system operates at about 95% to 97% efficiency.

The high frequency inverter which comprises the second part of the system consists of a push-pull power oscillator with associated auxiliary circuitry and a wattless ballast network. There has also been provided a low voltage current limiting remote control for the operation of the inverter.

DESCRIPTION OF THE PREFERRED EMBODIMENT

Figure 1:
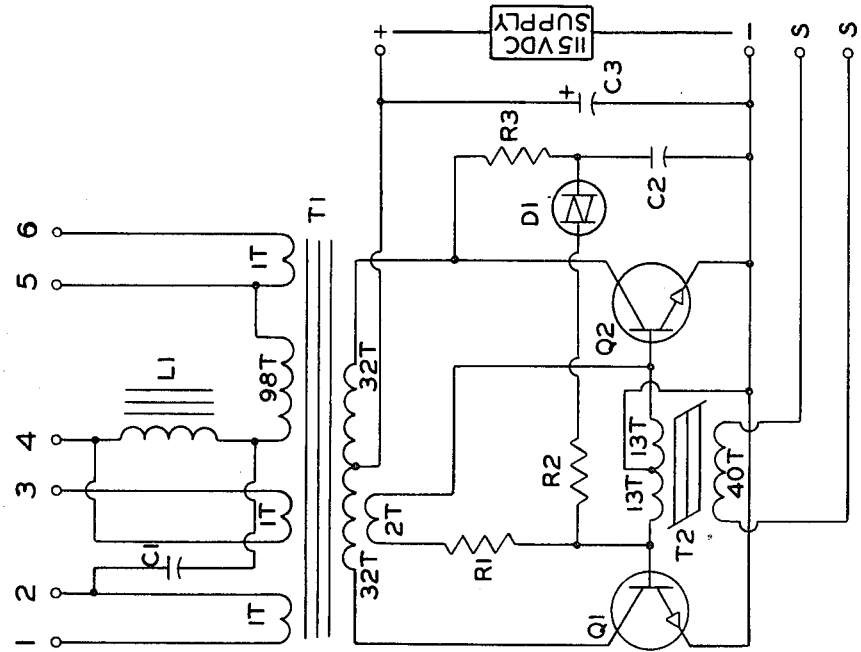
FIG. 1 shows one form of the inventive circuitry involving the direct current supply and high frequency inverter with its switching structure.

FIG. 1 of the drawing is a schematic diagram of the primary circuitry of the invention herein. The high frequency inverter comprises a push-pull oscillator with associated auxiliary circuitry and a wattless ballast network. The push-pull power oscillator is comprised of transistors Q1 and Q2 and transformer T1. Transformer T1 provides phase inversion for the transistors, positive feedback to sustain oscillations, and a means to match the load impedance to the impedance of the transistors. Positive feedback from a small winding 2T on transformer T1 supplies the base drive to the transistors through a current limiting resistor R1. The feedback is arranged so that one transistor is saturated when the other is in cutoff.

More particularly, the inverter comprises transistors Q1 and Q2 whose respective bases are connected to opposite terminals of a winding 13T of saturable transformer T2. The terminals of a primary winding 32T of transformer T1 are connected to the respective collectors of transistors Q1 and Q2 whose emitters are connected to circuit common. A secondary winding 2T, of transformer T1, has one terminal connected to the base of transistor Q2 and a second terminal connected to one terminal of a resistor R1 whose other terminal is connected to the base of transistor Q1. One terminal of a resistor R2 is connected to the base of transistor Q1 and the other terminal of resistor R2 is connected to one terminal of a diac D1. The other terminal of diac D1 is connected to one terminal of a resistor R3 and one terminal of a capacitor C2. The other terminal of capacitor C2 is connected to circuit common and the other terminal of resistor R3 is connected to the collector of transistor Q2. A capacitor C3 has one terminal connected to circuit common and another terminal connected to a center tap of the primary winding 32T. The center tap of primary winding 32T is connected to a positive DC supply terminal. The secondary 40T of saturable transformer T2 is connected across a switch s. Additional secondary windings of transformer T1 are connected to a plurality of flourescent lamps and a wattless ballast network.

The saturable transformer T2 is placed across the base-emitter terminals of the transistors. It is designed to saturate before T1 so that T1 may operate in its low flux region where core losses are reasonable. The small volume of transformer T2 makes its core losses insignificant. The operating frequency of the inverter is controlled by a volt-second capability of transformer T2. When the volt-second capability of transformer T2 is exceeded, its magnitization current increases rapidly subtracting from the available base drive to the transistor in saturation. As this transistor comes out of saturation, regenerative action drives it into cutoff while the other transistor is driven deeply into saturation. This process repeats itself twice each cycle, yielding a square wave secondary voltage at transformer T1.

Oscillators of the above type are quite symmetrical and may not self-start under certain conditions. Therefore, a starting circuit is provided to insure starting. Resistor R3, capacitor C2 and diac D1 form a relaxation oscillator which supplies current pulses to the base of transistor Q1 through a current limiting resistor R2 driving transistor Q1 into saturation which starts the oscillation cycle. Diac D1 is a conventional semiconductor, 1N5411 or RCA Part No. 45412. Charging resistor R3 is returned to the collector of transistor Q2 in order that the current pulses are delivered to transistor Q1 when it is in saturation after the inverter has started. Therefore, the starting pulses have no effect on the operation of the inverter after it has started.

Since flourescent lamps are a plasma discharge device, they have a negative operating impedance. Unless a greater positive impedance is placed in series with them, they would draw uncontrolled currents and damage themselves and the inverter. It is desirable that this positive impedance does not dissipate significant power and, therefore, a reactive impedance is used. The reactive impedance stores the current during part of the cycle and releases during the remainder of the cycle. Since the power is not dissipated, but only stored, a reactive impedance gives a "watt-less" ballasting means. In the circuitry shown in the drawing, both an inductive reactance and a capacitive reactance are employed. One lamp is ballast with inductor L1. The other lamp is ballast with a capacitor C1. The values are chosen so that, at the operating frequency of the inverter, the capacitive reactance balances out the inductive reactance. This transforms the impedance of the lamps to a positive resistive value that results in a minimum secondary current in transformer T1.

Capacitor C3 provides a low impedance at the inverter frequency so that inverters operating on the same line do not interact. Also, capacitor C3 provides energy storage during peak current drain allowing a fairly high source impedance. The single turn windings 1T on transformer T1 preheat the cathodes of the lamps lowering their ignition voltages which makes starting of the lamps easier.

A low voltage, current limiting, remote on-off control capability is provided at low cost through a secondary winding 40T on transformer T2. With the remote switch s open, the inverter operates normally. When the switch is closed, a low impedance is reflected into the primary of transformer T2. This low impedance shunts base current away from the transistors stopping the inverter. The voltage on the remote switch is less than 6 volts RMS and the current is less than 0.05 amperes RMS. An impedance of 20 OHMS may be placed in series with the switch and the unit will still control normally. This would allow long runs of low gauge, low voltage wire for control purposes.

The measured performance of this design is shown in Table 1.

Table 1

| | |
|---|---|
| Input Voltage (Volts D.C.) | 115 |
| Input Current (Ampere D.C.) | 0.716 |
| Input Power (Watts) | 82.3 |
| Output Power (Watts)* | 82 |
| Capacitive Lamp Current (RMS Amperes)* | 0.33 |
| Inductive Lamp Current (RMS Amperes)* | 0.37 |
| Capacitive Lamp Power (Watts)* | 45 |
| Inductive Lamp Power (Watts)* | 37 |
| Calculated Losses (Watts) | 4.7 |

*These values were numerically integrated from oscilloscope photographs. Their accuracy is on the order of ±5%. Operating frequency was nominally 22 kilocycles.

The unit provides the same light output as a conventional low frequency ballast with 85% or less power consumption. This yields a minimum increase in efficiency of 11% over conventional ballast designs. Typically, the savings could amount to 15% in power consumption. A large saving in initial cost of wiring could be achieved if the low-voltage remote control is employed. One could use 22 gauge wire without conduit in our system for the control line, whereas the normal prior art control line is used with 14 gauge wire in conduits.

There is thus shown a practical, high frequency ballast which has an inverter that has been designed for providing considerable savings in energy at a competitive installed cost. Similarly, a higher light output per lamp can be realized at the same power consumption of conventional low frequency ballasts.

Conventional fluorescent tubes will be connected with one end of one tube on terminals 1 and 2 and the other end of the tube on terminals 5 and 6. One end of a second tube would be connected on terminals 3 and 4, with the other end of that tube also connected to terminals 5 and 6. The terminals S—S at the lower end of the schematic diagram connected to switch means, which may comprise a conventional single pole, single throw switch, to operate the remote on-off circuit. The plus and minus terminals on the right hand side of the schematic diagram, connected by capacitor C3, are also connected to the leads of a 115 volt DC supply. It would be possible to have all of the ballasts in a fluorescent lighting system within a building controlled by a single 115 volt DC supply. It is also equally possible to provide a 120 volt AC supply to each ballast and then provide in the ballasts a conventional SCR phase control rectifier to convert the AC to DC and then feed the DC to the appropriate plus and minus terminals of the schematic diagram shown in the drawing. Typical of a rectifier circuit which may be utilized is that shown in U.S. Pat. No. 3,769,545. Any one of a number of conventional rectifier circuits with filters could be utilized to provide the required 115 volts DC to the inverter circuit shown in the schematic diagram.

Figure 2:
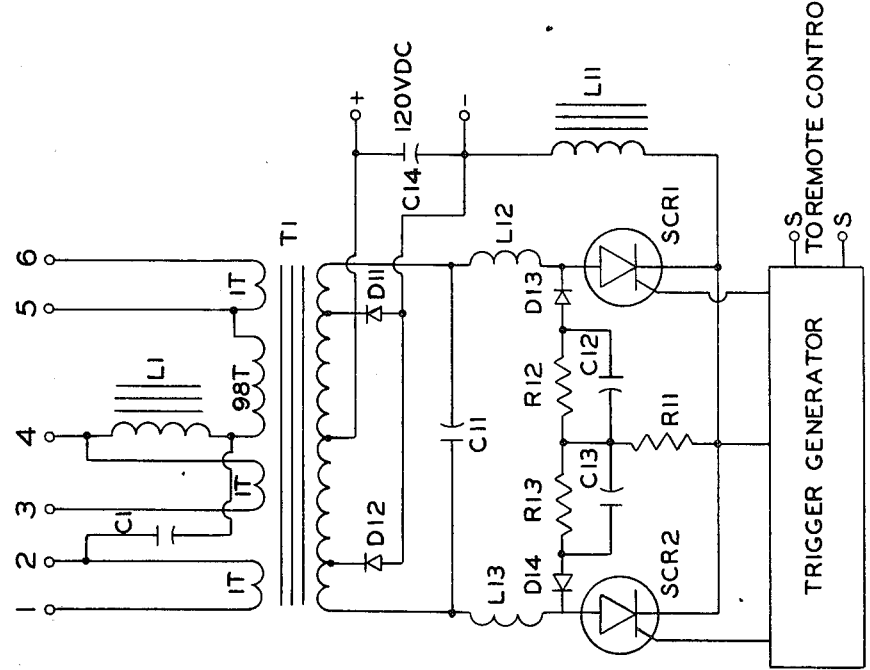
FIG. 2 is an alternative circuitry for that of FIG. 1.

In FIG. 2 a push-pull oscillator is constructed with two silicon controlled rectifiers SCR1 and SCR1, a transformer T1, and a frequency controlling circuit. The ballast could be identical to that employed by the transistor circuit. The frequency controller or trigger generator would be somewhat more complex.

The oscillation is started when a pulse is applied to the gate of SCR1 turning it on. Inductor L12 limits the turn on current to a safe value. Diode, D13; capacitor, C12; and resistors R11 and R12 limit the rate of change of voltage to a value which will not cause commutation failure or induced false triggering. L13, D14, C13, R13 and R11 provide the same functions for SCR2.

The full supply voltage is impressed upon one-half of the secondary of the output transformer T1. Capacitor C11 is charged to twice the supply voltage through the transformer action of T1.

The conventional trigger generator supplies a gate pulse to SCR2 at the appropriate time turning it on. Capacitor C11 discharges through SCR1 reversing its current thus initiating its turn off. The full supply voltage is now impressed upon the other half of the primary: reversing the secondary voltage. Capacitor C11 charges to twice supply voltage qwith an opposite polarity.

The oscillatory cycle is continued by gating on SCR1 again, etc. If the gating intervals are equal a square wave alternating current will be induced on the secondaries of T1.

Diodes D11 and D12 along with choke L11 return the excessive energy back to the DC supply. Acpacitor C14 provides a low AC source impedance and a temporary energy storage for the excessive energy.

What is claimed is:

1. A power source for supplying low pressure discharge lamps comprising:
   a. ballasting means connected to said lamps and to windings of a transformer,
   b. a direct current source,
   c. inverting means connected to said direct current source to produce high frequency alternating current including a plurality of active devices connected to other windings of said transformer, a frequency controlling device and a low voltage energy limited remote control means magnetically coupled to said inverting means for disabling said inverting means.

2. The power source of claim 1 in which said frequency controlling device is a saturable transformer connected to said active devices and said low voltage energy limited remote control means includes a winding on said saturable transformer.

3. The power source of claim 1 in which said low voltage control means includes a switch for disabling said inverting means, when closed.

4. The power source of claim 1 wherein said inverting means includes a pair of SCR's.

5. The power source of claim 1 wherein said inverting means includes a push-pull transistor oscillator having at least a pair of transistors.

6. The power source of claim 5 in which said inverting means includes a starting circuit including a diac to supply current pulses to the base of one of said transistors to drive that transistor into saturation to start said oscillator.

7. The power source of claim 5 including a saturable transformer connected between the bases of said transistors.

8. The power source of claim 7 in which said low voltage control means includes another winding on said saturable transformer connected to a remote switch for disabling said inverter when said switch is closed.

9. The power source of claim 8 wherein said remote switch is connected via low gauge conductors.

10. A remotely controlled power inverter in which a switch means, remote from said inverter, is connected thereto with low gauge conductors comprising;
   a. a source of direct current,
   b. a pair of active devices powered by said source,
   c. a saturable transformer including a first winding connected between the control of electrodes of said active devices,
   d. a second winding of said transformer connected to said switch means by said low gauge conductors whereby a low impedance is reflected into said first winding to shunt current from said control electrodes to inhibit operation of said inverter when said switch is closed.

* * * * *